Feb. 15, 1955  F. MASSA  2,702,260
APPARATUS AND METHOD FOR THE GENERATION AND USE OF SOUND
WAVES IN LIQUIDS FOR THE HIGH-SPEED WETTING
OF SUBSTANCES IMMERSED IN THE LIQUID
Filed Nov. 17, 1949  2 Sheets-Sheet 1

Frank Massa
Inventor

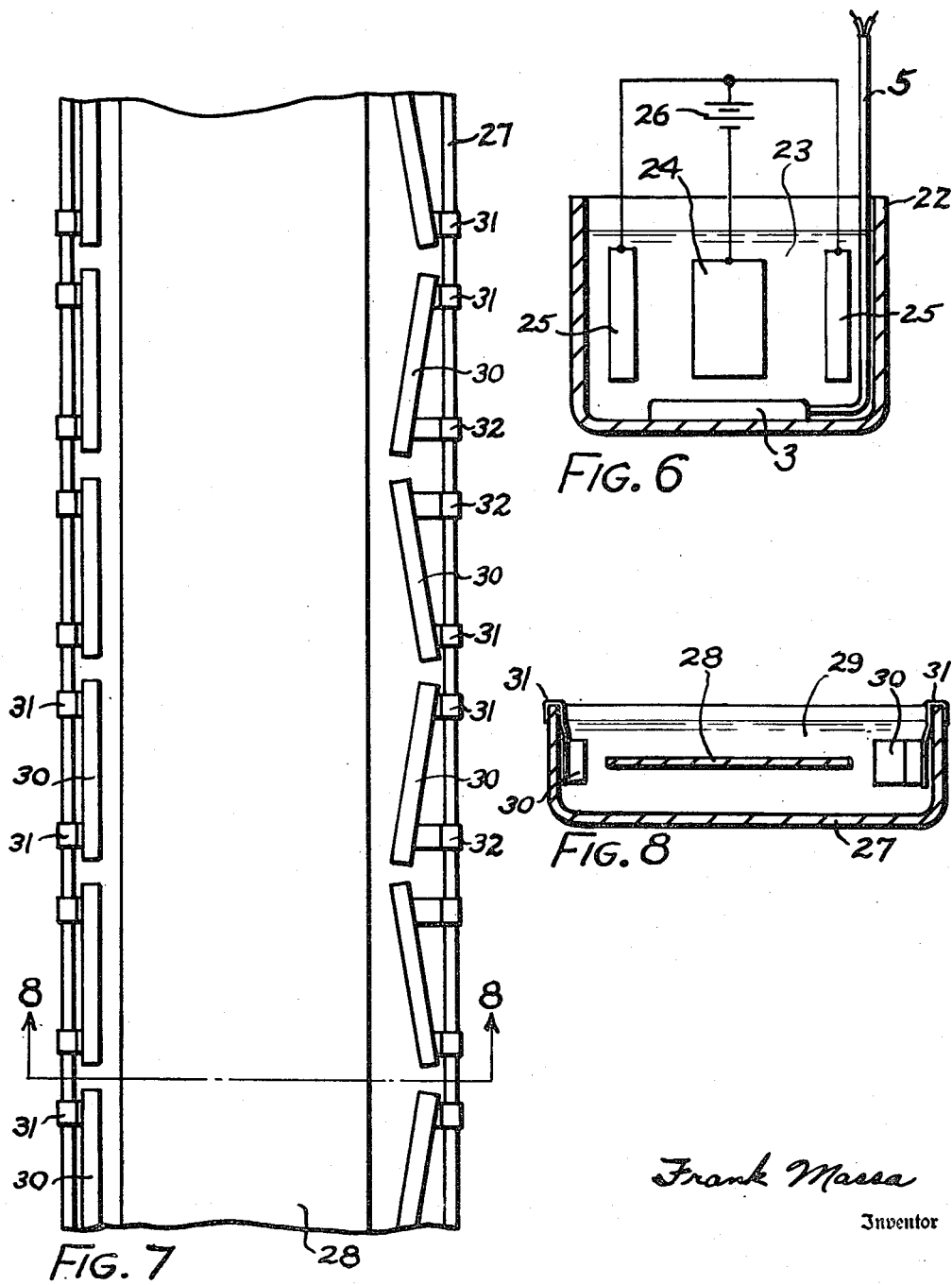

United States Patent Office 2,702,260
Patented Feb. 15, 1955

2,702,260

APPARATUS AND METHOD FOR THE GENERATION AND USE OF SOUND WAVES IN LIQUIDS FOR THE HIGH-SPEED WETTING OF SUBSTANCES IMMERSED IN THE LIQUID

Frank Massa, Cleveland Heights, Ohio

Application November 17, 1949, Serial No. 127,908

12 Claims. (Cl. 134—1)

This invention is concerned with means for increasing the wetting action between a liquid and a material that may be immersed therein. There are numerous processes which depend, for their effectiveness, upon the wetting action between a liquid and a second substance immersed in the liquid. A few examples of such processes include the degreasing of metals and other substances, the removal of foreign surface deposits on substances, such as oxides and the like, the coating of surfaces with fine films or dyes, the dyeing of fabrics, and numerous others. It is a well-known fact that the effectiveness of such processes, of which a few examples have just beeen listed, depends on the completeness with which the liquid substance penetrates or "wets" the surface of the article. Many methods, having varying degrees of success, have been developed for speeding up the time for completing the wetting action in such processes. In some cases, chemical wetting agents have been added to the liquid. In other instances, the liquids are heated to high temperatures or even vaporized to accelerate the wetting action. Typical examples of the application of hot liquids is in the degreasing of metals or in the pickling of metals for oxide removal. With the use of hot caustic solutions for metal cleaning and hot acid solutions for the pickling process, the added nuisance of the hot caustic or acid fumes is tolerated in return for the advantage of reduced time of cleaning. Even under this accelerated condition, exposure of the metals for several minutes is required to accomplish the desired surface cleaning.

I have found it possible to very greatly speed up the wetting action in such processes by introducing sound energy of fairly high intensity into the liquid. Even by employing cold liquids, I have found it possible to reduce a normal hot fifteen-minute cleaning cycle for greasy steel plates to an exposure time of only a few seconds. Typical examples of some of the industrial applications which I have found to be very greatly improved by the use of sound waves include the high-speed cleaning of metals and other solids, the high-speed dyeing of fabrics in which the penetration of the dye into the fibres is greatly speeded up by the increased wetting action resulting from the acoustic agitation of the dye liquor, improved electroplating in which the electrolyte is acoustically activated during the plating process to result in more uniform, porous-free coatings than are produced in the conventional plating processes, and many other specific applications in which the process depends on the wetting action between a liquid and an immersed substance.

The primary object of this invention is to employ acoustic energy to greatly accelerate the wetting action between a liquid and a second substance which is immersed in said liquid.

Another object of this invention is to provide a new improved method for the rapid degreasing of materials, such as metals, in which I have obtained results after a few seconds' exposure of the cleaning solution to sound waves at room temperature, comparable to the cleaning resulting from boiling the same greasy parts for fifteen to twenty minutes in the same cleaning solution.

A further object of this invention is to improve the method of electroplating in which better homogeneous coatings result by exposure of the electrolyte to a sound field during the plating process.

A still further object of the invention is to accelerate the normal process for dry cleaning garments in which the removal of stains on clothing is accomplished almost instantaneously by employing acoustic energy within the dry cleaning liquid within which the garments are placed for cleaning.

Another object of this invention is to provide a method for greatly reducing the time required to clean long strips of materials as they are moved rapidly through the cleaning tanks.

A still further object of this invention is to provide convenient methods for subjecting materials to the action of acoustically-activated liquids whereby any standing wave phenomena, which might prevent portions of the materials from being exposed to high-intensity sound, are virtually eliminated.

Another object of this invention is to provide tank structures containing liquids with means for setting up sound waves in the liquids in which there is relative motion between the sound wave pattern with respect to the position of the articles immersed in the liquid.

Another object of the invention is to provide a special design of an acoustically-activated tank for use in the cleaning of a continuously-moving strip of steel, in which the length of the cleaning tank is very greatly reduced, thus effecting great economies over the conventional methods now employed for such cleaning operations.

A still further object of this invention is to provide tank structures containing liquids and associated sound generators for essentially filling the entire volume of liquid with intense sound vibrations.

Additional objects of my invention will become apparent with the detailed specifications which follow. The novel features that I consider characteristic of my invention are set forth with particularity in the appended claims. The invention, itself, however, both as to its organization and method of operation as well as advantages thereof will best be understood from the following description of several embodiments thereof when read in connection with the accompanying drawings in which—

Fig. 6 is a partial section and partially schematic view of another form of my invention for improving the quality of the coating deposited during an electroplating process.

Fig. 7 is a plan view of a portion of a long tank such as are employed in steel finishing mills for the pickling or cleaning of strip steel. The tank is modified to incorporate the teachings of my invention whereby greatly accelerated cleaning will result by the introduction of an intense transverse sound field across the surface of the moving sheet.

Fig. 8 is a section taken along the line 8—8 of Fig. 7.

Figure 1:
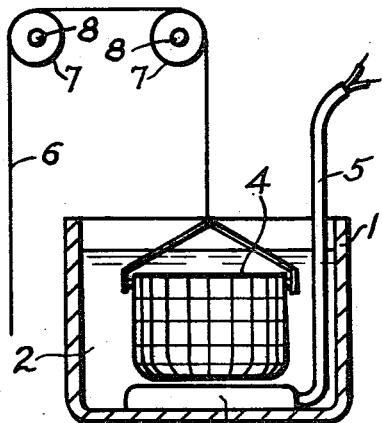
Fig. 1 is a partially schematic and partial sectional view of one means for employing my invention for the rapid cleaning of metals or other materials or for the rapid dyeing of materials.

Referring more particularly to Fig. 1, I have shown a partially schematic view of one form of my invention which permits greatly accelerated wetting action between a liquid and a second material immersed in the liquid. In the arrangement illustrated, a tank or container 1 is filled with a liquid 2 which may be, for example, a standard caustic cleaning solution if metal parts are to be degreased, or the liquid may be a standard pickling solution if oxide coatings are to be rapidly removed, or, again, the liquid may be a dye if an accelerated dyeing process is to be undertaken, or, finally, the liquid may be any one of several other substances employed in numerous conventional processes in which articles are normally immersed in the liquids for relatively long periods of time to obtain the desired wetting or penetration of the liquid into the surfaces of the immersed substances. A sound generator 3 is shown resting on the bottom of the tank 1 and is arranged to impart sound vibrations into the liquid 2. The surface area of the sound generator is such that it effectively covers the projected area of the wire basket 4, which is shown suspended in the liquid directly over the radiating surface of the sound generator 3. Although I have shown the sound generator 3 actually immersed within the liquid bath, I have produced equally satisfactory results by mounting the generator 3 outside the tank and attaching the sound radiating surface of the generator to a sound transparent window built into the wall of the tank. Suitable sound transparent windows may consist of metallic diaphragms or rubber or plastic sheets inserted into openings in the wall of the tank, and the window material may be selected to be chemically inert with regard to liquid which comes in contact with its surface. Although the sound generator 3 is shown mounted on the bottom wall of the tank 1, it may be mounted along the side walls, if desired. It is also possible to employ more than one generator within the same tank, if desired. An electric cable 5 serves to carry the electric power required to operate the sound generator 3. The articles to be exposed to the wetting action of the liquid 2 are placed in the wire basket 4 and the sound generator 3 is energized so that a sound field is set up in the liquid. The basket is preferably mechanically oscillated in the liquid by operating the flexible cord 6 shown schematically mounted over the pulleys 7, which are free to rotate on the shafts 8. The mechanical oscillation of the wire basket causes a breaking up of any fixed standing wave pattern of the sound field within the liquid 2 which I have found to be necessary if uniformity is to be obtained among the treatment of all the material contained within the basket. Another manner for eliminating a standing wave sound pattern in the liquid is to mechanically oscillate the sound generator 3 or to electrically oscillate the frequency of the electric current being supplied by the cable 5 about the mean frequency of operation desired.

I have employed the method illustrated in Fig. 1 to very greatly speed up the time required for many conventional processes in which a thorough, penetrating wetting action between a liquid and the surfaces of an immersed material is the basic requirement. As a specific example, I have been able to completely degrease the surfaces of metallic plates by immersing them in a dilute cold caustic solution for only a few seconds while the liquid was being activated with sound waves. By exposing the same greasy parts to the same cold cleaning solution without the presence of sound, the surfaces were not clean even after exposures of one hour. To achieve the same completeness of degreasing as I was able to obtain during a few seconds' exposure of the parts to the acoustically-activated cold solution, I found it necessary to boil the parts in the same solution for a period of approximately twenty minutes. I also found that the frequency of the sound vibrations was not at all critical in accomplishing my improved results. The greatly accelerated wetting actions that caused the high-speed cleaning were obtained at sonic frequencies in the range 1 kc. to 15 kc. They were likewise obtained in the lower ultrasonic range of 15 kc. to 100 kc., as well as at the higher frequencies of several hundred kilocycles. The actual choice of frequency becomes a matter of economic or other considerations. For example, in a large-scale cleaning or dyeing operation that has to be carried out in relatively open vats, the use of sonic frequencies may become objectionable because of the noise that will be radiated into the room. If the vats are surrounded with sound-proofing material, it would be practical to employ frequencies in the sonic range. The use of ultra-sonic frequencies prevents the generation of any noise and would, therefore, be preferred for operations where quiet is important.

Although, as I have stated, it is possible to obtain greatly accelerated wetting action over extremely wide frequency ranges in either the sonic or ultrasonic region, I have found that in applications requiring quiet operation and ultrasonic frequencies, the use of the lower ultrasonic range (approximately 15 kc. to 100 kc.) offers several advantages in many processes. One of the advantages is that the sound generator may be of the magnetostriction type which makes use of nickel or cobalt alloys which, in turn, means a very rugged structure. At the higher ultrasonic frequencies, piezo-electric crystals would generally be required, which are relatively fragile compared with metals, with a corresponding reduction in the ruggedness of the sound generator. A second economic advantage in the use of the lower ultrasonic range is that motor generator sets can be employed for generating the electric power necessary to operate the sound generator. For installations requiring large-scale amounts of power amounting to tens or hundreds of kilowatts, the electrical energy can be produced more economically as well as within a smaller space by motor-generator sets as compared with general present-day types of vacuum tube power supplies.

A still further advantage of the lower ultrasonic frequencies as compared with the higher ultrasonic frequencies results from the relatively larger wavelength of the sound produced in the liquid. These longer wavelengths are transmitted among the articles placed in the liquid with greater ease than is possible with the shorter wavelengths at the higher frequencies. The shorter wavelengths would be more easily shadowed even by the smaller objects placed in the tank. Another advantage of the lower frequencies is that they are not absorbed as readily as the higher frequencies and they can, therefore, be transmitted through greater distances in the liquid without attenuation.

The amount of acoustic power required for obtaining the accelerated wetting actions disclosed in this invention will vary with the size and desired speed of the process. In general, the higher the desired speed for the complete wedding action to take place, the larger the amount of power required. Also, the larger the vat, the larger the amount of power needed. On a per unit area basis, I found that acoustic powers in the approximate range 5 to 50 watts per square inch of sound generator radiating surface very greatly increase the wetting action of the liquid which is being activated. At the lower acoustic power densities, the increased speed of the wetting action is not as great as results when the power densities are increased. An actual upper limit to the power density which is possible to be applied to a liquid is reached when excessive cavitation results in the liquid, at which point the sound generator is effectively uncoupled from the liquid and the transmission of sound is actually reduced with a resulting loss in efficiency. The actual acoustic power at which excessive cavitation takes place will vary with the liquid and the pressure under which the liquid is held and, in general, the optimum operating point must be determined for each different situation.

Although a basket is shown for holding the articles in Fig. 1, it is obvious that if the conditions permit, the articles to be exposed to the sound field may be suspended directly into the liquid. For example, individual metal parts could be hung on hooks and immersed directly into the cleaning solution. Individual garments, fabrics, or spools of threads or fibres could be individually suspended in either an acoustically-activated cleaning or dyeing solution, depending on whether the materials are to be cleaned or dyed. Alternatively, these same articles could be placed in the basket 4 and be similarly exposed to the particular acoustically-activated liquid desired with the same end result of producing a greatly accelerated rate of the cleaning or dyeing process.

The size of the equipment illustrated in Fig. 1 may be very large to accommodate hundreds or thousands of pounds of metal stampings in one loading of the basket, or the equipment may be very tiny in size in which the size of the basket may be only a few centimeters diameter, such as would be employed for the cleaning of jewelry or watch parts.

Figure 2:
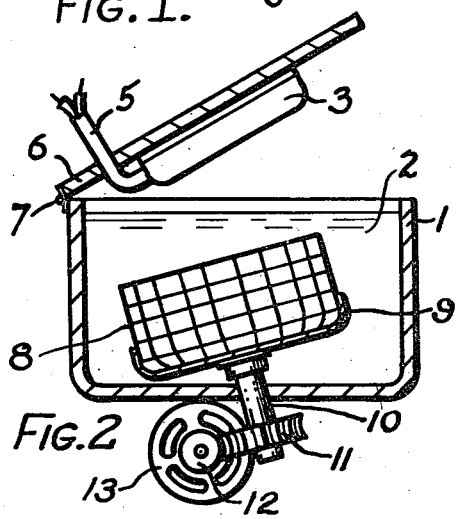
Fig. 2 is a partial section and partially schematic view of another form of embodiment of my invention, in which the articles to be cleaned or dyed are placed in an inclined basket which is made to rotate on its inclined axis to cause the materials placed within the basket to be tumbled for permitting complete exposure of all the materials' surfaces to the sound field.

In Fig. 2 is shown a variation in the mechanical arrangement of the same general type of equipment illustrated in Fig. 1. In Fig. 2, the tank 1, which is similar to the tank of Fig. 1, is provided with a lid 6 and hinge 7. The sound generator 3 is mounted on the bottom surface of the lid 6, as indicated, and the cable 5 which supplies the electric power to the sound generator is passed through an opening in the lid 6, as illustrated. The liquid 2, similar to the liquid described in connection with Fig. 1, fills the tank and a wire basket 8 is mounted on an inclined support 9 which is attached to a shaft 10 which passes out through the bottom of the tank through a liquid-tight bearing, the details of which are not shown. A worm gear 11 is fastened to the shaft 10 and is engaged in operative relation to a worm 12, which is driven by a motor schematically shown as 13, or by any other suitable rotating means. After the articles to be processed in the liquid are placed within the basket 8, the lid 6 is lowered to seat over the open surface of the tank 1 and the sound generator 3 makes contact with the liquid 2 and engages its sound radiating surface with the liquid. During the period in which the articles are exposed to the sound field which is set up in the liquid by the sound generator 3, the wire basket 8 is preferably rotated about the inclined axis schematically illustrated in the figure. During this rotation, the articles are caused to tumble about and expose themselves to various portions of the sound field. In this manner, if any standing waves are set up within the tank, the articles will be effectively presented to all parts of the standing wave system and, therefore, receive on the average the same amount of exposure as every other portion of the contents of the basket 8.

Figure 3:
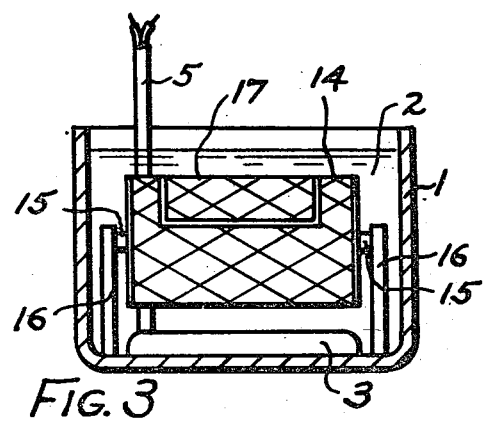
Fig. 3 is another partial section view showing another form of my invention in which the materials to be cleaned or dyed are placed in a cylindrical cage which is rotated in the liquid to cause a tumbling of the materials for the purpose of exposing all the surfaces to the sound field.

In Figure 3 is shown another variation of the mechanical arrangement illustrated in Figs. 1 and 2. In this case, the tank 1 is filled with the liquid 2, the same as described in connection with Figs. 1 and 2. The sound generator 3 is shown placed on the bottom of the tank inside the liquid in the same manner as the generator was placed in Fig. 1. The cable 5 provides the electric connection to the sound generator 3, as previously described. In this arrangement, a wire basket 14 consists of a cylindrical wire cage mounted on a shaft 15 which rotates on bearings provided in the fixed supports 16. A lid 17 permits an opening to the cylindrical cage 14 through which may be placed the articles which are desired to be exposed to the liquid 2. In this arrangement, the cylindrical cage 14 is preferably rotated during the period of exposure in order to permit the sound generated in the liquid to reach all parts of the material placed in the cage on a more uniform basis. In the illustrated method of Fig. 3, it is also possible to mount the sound generator 3 on the side walls of the tank, if desired, or on the outside of the tank, in which case the sound radiating surface of the generator 3 would be coupled through a suitable sound transparent window, as described in connection with Fig. 1.

Figure 4:
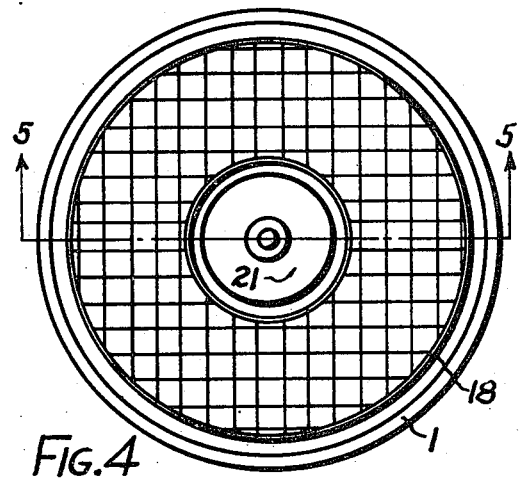
Fig. 4 is a plan view showing another form of my invention in which a cylindrical type of sound generator is employed for sending energy radially outward throughout the entire volume of an annular-shaped wire basket within which the materials are placed for exposure to the sound field.
Figure 5:
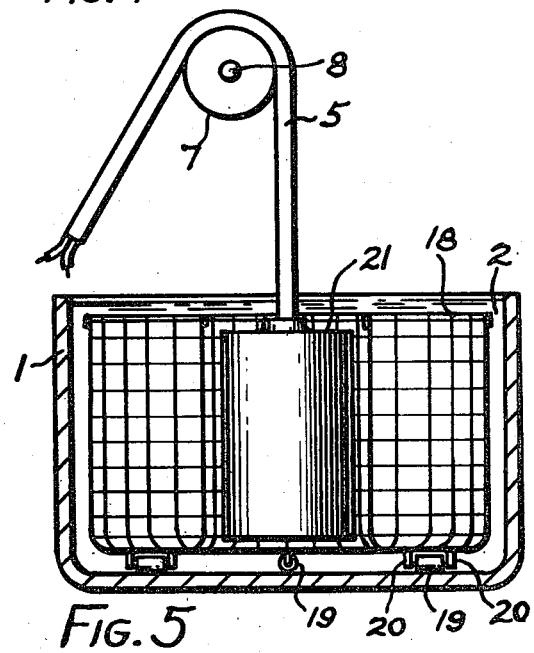
Fig. 5 is a partial section taken along the line 5—5 of Fig. 4.

Figs. 4 and 5 illustrate still another embodiment of the same basic method described above. In this arrangement, a tank 1, which contains the liquid 2 is provided with an annular-shaped wire basket 18 which is placed in the tank, as illustrated. The top side of the basket 18, as shown in Fig. 5, is left open to permit the convenient placing of articles therein which are to be exposed to the liquid 2. The basket 18 is shown mounted on a number of rollers 19 which are arranged so that they may rotate within the fixed bearing supports 20. The purpose of these rollers is to permit a rotational motion of the basket 18. In the arrangement shown, the sound generator consists of a cylindrical structure 21 which is suspended near the center line of the tank by means of its electric cable 5 which runs over a pulley 7 which rotates on the shaft 8. The cylindrical sound generator 21 may actually be a true cylindrical radiator, such as, for example, a cylindrical shell of piezo-electrically active barium titanate which, when supplied with alternating electric current between the inside and outside surfaces of the cylindrical shell, will cause the cylindrical element to actually expand and contract, thereby generating cylindrical sound waves which will be radiated outwardly in all directions throughout the surface of the liquid 2. On the other hand, the cylindrical sound generator 21 need not be a true cylindrical sound generating surface in order to accomplish the same equivalent result. Another type of construction, for example, could be the mounting of a number of rectangular sound generating strips placed circumferentially about a generally cylindrical surface arranged about the center line of the unit. If the sound generator 21 is made up of such an array of a number of vertical strips of sound-radiating surfaces, the effect will be to send out sound energy throughout most of the volume of the liquid 2. If the spacing of the vertical sound generating strips around the cylindrical surface is large compared with the wavelength of the sound which is being generated in the liquid, there may be some variation in the intensity of the sound field along different radial directions from the center line of the generator 21. For this type of sound field, the sound transparent container 18 could be rotated about the center axis, thereby presenting each portion of the contents of the structure to all parts of the sound field. The same averaging of the sound field may be produced by mechanically oscillating the sound generator 21 about its vertical axis and a still further averaging of the sound intensity within the tank may be produced by oscillating the sound generator 21 up and down in a vertical direction and also by varying its operating frequency over a small range above and below its normal value.

The articles to be exposed to the accelerated wetting action of the acoustically-activated liquid 2 may be placed directly into the annular wire cage 18. Another method for employing the arrangement of Figs. 4 and 5 is to suspend individual articles or groups of articles to be treated directly into the liquid by placing the articles on rods, or the like, which may be rested radially across the open end of the annular cage 18. If the cage 18 is kept rotating about its vertical axis, a continuous production cycle for cleaning or dyeing can be established, in which individual articles or groups of articles may be suspended into the liquid 2 from the open top of the annular cage and removed at a later position around the periphery of the tank.

In Fig. 6 is shown a schematic arrangement for greatly improving the quality of electro-plated surfaces. An electrically non-conducting tank 22 contains the plating solution 23 and the article to be plated 24 is connected as the cathode to the battery 26. The anodes 25 consist of the metal which is to be deposited on the article 24, which is the conventional arrangement for standard electroplating procedure. In order to improve the deposit of the metal on the article 24, the solution 23 is activated with acoustic energy from the sound generator 3 which is placed inside the tank in the same manner as described in connection with Fig. 1. By subjecting the plating solution to the action of the sound waves, a dual action takes place which results in a greatly improved plating deposit. In the first place, the presence of the sound field produces an intense cleaning action upon the object 24, resulting from the violent vibration of the particles of the plating solution against its surface. This continuous self-cleaning operation results in very intimate bonding of the plating surface to the base metal. The continued activation of the plating solution during the later stages of the plating process causes a more uniform deposit, which results in virtually porous-free plated surfaces. In a single plating cycle, with the application of a sound field in the plating solution, a solid homogeneous plating surface is obtained of a type that would ordinarily require several separate platings with an intermediate buffing operation between the successive plating cycles.

Fig. 7 shows a plan view of a continuous process for efficiently exposing a continuously-moving strip of material to a sound field. Fig. 8 is a cross-section taken along the line 8—8 of Fig. 7. Referring to Figs. 7 and 8, 27 is a relatively wide shallow tank through which a wide strip of material 28 may be moved at relatively high speed. An example of such a system may be found in the pickling or cleaning line in a strip mill of a steel rolling plant. For example, 28 may be a sheet or strip of steel which is being passed through a pickling or cleaning solution 29 contained in the tank 27. Present practice in steel mills requires the exposure of the steel sheet to a hot, caustic cleaning solution for many minutes for the successful removal of the grease or oil from its surface and, in the pickling line, the moving sheet is generally exposed for many minutes in a hot acid bath for removing oxide surfaces. By employing relatively intense sound fields within the cleaning or pickling liquids, as already described in connection with Fig. 1, it is possible to very greatly reduce the time of exposure of the sheet steel to the cleaning or pickling solution to accomplish the desired cleaning. As explained in connection with Fig. 1, the application of a sound field over the surface of the material being cleaned will reduce a cleaning operation which would have required many minutes' exposure in a hot solution to only a few seconds' exposure to the same acoustically-activated cold solution.

In the arrangement illustrated in Fig. 7, I provide a number of sound generators 30 which are schematically shown mounted along the side walls of the tank 27, as illustrated. The sound generators 30 are shown suspended by the brackets 31 and 32 and are so arranged that a long and narrow sheet of sound is generated which passes parallel to the moving strip 28 and results in the simultaneous activation of the liquid which is in contact with both the top and bottom sides of the sheet 28. In the view of Fig. 1, I have shown a number of rectangular-shaped sound generators 30 inclined at a small angle to the long axis of the tank. This arrangement is to reduce the tendency for standing waves to be set up within the tank and, therefore, produces a more uniform distribution of the sound field. Although the sound generators 30 are shown mounted on both side walls of the tank, it is not always necessary to place the generators on more than one side unless the sheet 28 is extremely wide and moving very fast through the tank. It is also possible to mount the sound generators outside the tank, if desired, and cause the sound to enter through suitable sound transmitting surfaces which may actually be part of the tank wall. Instead of inclining some of the sound generators, as shown, it is possible to oscillate the frequency of the electric power supply to the sound generators for the purpose of reducing any standing waves in the tank, as already described above.

In some of the modern steel strip mills, the speed with which the sheet travels is a few thousand feet per minute and the conventional cleaning or pickling process requires lengths of tanks of several hundred feet in order to provide sufficient time of exposure of the metal to the hot cleaning solution. By providing a sound field of the intensities above described in the liquid 29, the exposure time for accomplishing the same degree of cleaning is reduced to only a few seconds and the length of the cleaning tank is very considerably reduced. The electrical connection to the several sound generators 30 is made by separate cables which are not shown and which would be sealed to the sound generators, such as the cables 5 shown in the other figures. An advantage for employing relatively narrow, long sound generators to set up a sound field which passes parallel to the surfaces of the sheet 28 is that a much smaller total area of sound generator is required by this arrangement than would be the case if the bottom surface of the tank were lined with sound generators to propagate sound in a direction at right angles to the surface of the sheet. In this latter arrangement, besides the much greater total sound generator requirement needed for the bottom of the tank, an additional number of generators would have to be mounted near the top surface of the liquid facing downward to activate the top surface of the sheet 28.

The arrangement shown in Figs. 7 and 8 is not only illustrative of high-speed strip cleaning or pickling but is also representative of a high-speed continuous dyeing arrangement in which a sheet of fabric represented by 28 is rapidly moved through the acoustically-activated dye represented by the liquid 29.

Although I have chosen only a few specific embodiments to illustrate my invention, it will be obvious to those skilled in the art that numerous deviations may be made in the specific details for executing the desired function and I therefore, desire that my invention shall not be limited except insofar as is made necessary by the prior art and by the spirit of the appended claims.

I claim as my invention:

1. In combination, a tank containing a liquid, mechanical means adapted for moving a sheet through said liquid, and directional sound generating means mounted in relatively close proximity to the edge of said sheet and adapted for propagating sound waves in a path essentially at right angles to the edge of the sheet whereby the sound waves progressively impinge over both surfaces of said sheet.

2. The invention set forth in claim 1 characterized in that the frequency of said sound waves lies in the frequency region between 15,000 and 100,000 cycles per second.

3. In combination, a tank containing a liquid, mechanical means adapted for moving a sheet through said liquid, a plurality of sound generators each having one long and one narrow dimension mounted in relatively close proximity to the edge of said sheet and arranged with their long dimensions lying essentially in the plane of said sheet and adapted for generating a plurality of narrow beams of sound which are propagated across the surface of said sheet.

4. The invention set forth in claim 2 characterized in that said sound generating means comprises a plurality of rectangular-shaped units, and further characterized in that the sound radiating surfaces of said plurality of rectangular-shaped units do not all lie in the same plane.

5. In combination, a tank containing a liquid, a sound generator placed near and along the vertical center line of said tank, a sound transparent container mounted within said tank and adapted to receive solid objects, and means for periodically varying position of the sound generator relative to the position of said sound transparent container whereby the pattern of the sound field set up in the liquid is varied, said sound generator characterized in that its frequency of vibration lies in the region above 15,000 cycles/second, and further characterized in that the sound energy level set up in the liquid lies in the approximate range 5 to 50 watts per sq. in. of radiating surface of said sound generator.

6. The method for increasing the wetting action between two dissimilar materials, at least the first of said two materials being in the liquid state, including the following steps: (1) placing said two materials together within a container, (2) introducing sound vibrations within said first liquid material by coupling the vibrating portion of a sound generator to said liquid, and (3) varying the standing wave pattern of the sound vibrations introduced within the said first liquid, the sound vibrations characterized in that the frequency lies above 15,000 cycles per second and further characterized in that the energy level set up in the liquid lies in the approximate range 5 to 50 watts per sq. in. of radiating surface of the said sound generator.

7. The method for increasing the wetting action between two dissimilar materials, at least the first of said two materials being in the liquid state, including the following steps: (1) placing said two materials together within a container, (2) introducing sound vibrations within said first liquid material by coupling the vibrating portion of a sound generator to said liquid, (3) adjusting the energy density of the sound wave set up in the liquid to be in the range 5 to 50 watts per square inch of radiating area of said sound generator, and (4) adjusting the frequency of vibration of the sound generator to lie in the region above 15,000 cycles per second.

8. In combination, a tank capable of holding a liquid, a sound generator adapted for transmitting sound energy into said liquid, a sound transparent container mounted within said tank and adapted to receive solid objects, and means for imparting relative motion between said sound transparent container and said sound generator, the sound generator characterized in that its frequency of vibration lies above 15,000 cycles per second, and further characterized in that the sound energy transmitted into the liquid lies in the approximate range 5 to 50 watts per sq. in. of radiating surface of said sound generator.

9. In combination, a tank containing a liquid, mechanical means for moving a strip of material in a given direction through said liquid, and sound generating means adapted for setting up sound waves essentially at right angles to the direction of motion of said strip, said sound generating means characterized in that the generated sound waves impinge upon the entire surface of said strip as it moves along within said tank, said sound generating means characterized in that the frequency of vibration lies in the region above 15,000 cycles per second, and further characterized in that the energy level produced in said liquid lies in the approximate range 5 to 50 watts per sq. in. of radiating area of said sound generating means.

10. In combination, a tank capable of holding a liquid, a sound generator adapted for transmitting energy within said liquid, means for suspending solid objects within said liquid, means for imparting relative mechanical motion between said solid objects and said sound generator whereby the entire surface of said solid objects are exposed to the action of said sound energy, said sound generator characterized in that its frequency of vibration lies above 15,000 cycles per second, and further characterized in that the energy level produced in the liquid lies in the approximate range 5 to 50 watts per sq. in. of radiating area of said sound generator.

11. In combination, a tank containing a liquid, mechanical means for moving a sheet through said liquid, a rectangular-shaped sound generator mounted in relatively close proximity to the edge of said sheet and arranged with its long dimension lying essentially in the plane of said sheet and adapted for generating a narrow beam of sound which is propagated across the surface of said sheet.

12. The method for cleaning solid objects including the following steps: (1) placing said solid objects into a liquid, (2) introducing sound vibrations within said liquid by coupling the vibrating portion of a sound generator to said liquid, (3) adjusting the frequency of said sound vibrations to lie in the region above 15,000 cycles per second, and (4) adjusting the energy level of the sound vibrations set up in the liquid to lie in the range 5 to 50 watts per sq. in. of radiating area of the said sound generator.

References Cited in the file of this patent

UNITED STATES PATENTS

| | | |
|---|---|---|
| 2,241,646 | Rathjens | May 13, 1941 |
| 2,293,840 | Lignian | Aug. 25, 1942 |
| 2,468,550 | Fruth | Apr. 26, 1949 |
| 2,470,741 | Gordon | May 17, 1949 |
| 2,495,295 | Spanier | Jan. 24, 1950 |

FOREIGN PATENTS

| | | |
|---|---|---|
| 645,385 | Germany | May 29, 1937 |
| 548,960 | Great Britain | Oct. 30, 1942 |
| 733,470 | Germany | Mar. 26, 1943 |
| 587,214 | Great Britain | Apr. 17, 1947 |

OTHER REFERENCES

Chemical Abstracts 37, 2186 (1943), abstract of Sokolov et al., J. Applied Chem. (U. S. S. R.) 14, 843–8 (1941).

Rummel et al., Korrosion v Metallschutz, 19, 101–4 (1943) (204/154.1).

Pinsky, Monthly Review of American Electroplater's Soc. 32, No. 7, 688–90, July 1945 (204/154.1).